US012095350B2

(12) United States Patent
Dong et al.

(10) Patent No.: US 12,095,350 B2
(45) Date of Patent: Sep. 17, 2024

(54) CASCADED POWER ELECTRONIC TRANSFORMER AND CONTROL METHOD THEREFOR

(71) Applicant: Sungrow Power Supply Co., Ltd., Hefei (CN)

(72) Inventors: Yue Dong, Hefei (CN); Jiacai Zhuang, Hefei (CN); Jun Xu, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 112 days.

(21) Appl. No.: 18/010,435

(22) PCT Filed: May 21, 2021

(86) PCT No.: PCT/CN2021/095148
§ 371 (c)(1),
(2) Date: Dec. 14, 2022

(87) PCT Pub. No.: WO2022/068222
PCT Pub. Date: Apr. 7, 2022

(65) Prior Publication Data
US 2023/0231466 A1    Jul. 20, 2023

(30) Foreign Application Priority Data
Sep. 30, 2020   (CN) .......................... 202011069564.2

(51) Int. Cl.
*H02M 1/00*    (2007.01)
*H02M 1/08*    (2006.01)
(Continued)

(52) U.S. Cl.
CPC ......... *H02M 1/007* (2021.05); *H02M 1/0074* (2021.05); *H02M 1/081* (2013.01);
(Continued)

(58) Field of Classification Search
CPC .... H02M 1/007; H02M 1/0074; H02M 7/217; H02M 7/483; H02M 7/49
See application file for complete search history.

(56) References Cited

U.S. PATENT DOCUMENTS 8,711,585 B2    4/2014  Liu et al.
2004/0027842 A1 2/2004  Tanabe et al.
(Continued)

FOREIGN PATENT DOCUMENTS

CN      1479440 A      3/2004
CN    101917126 A     12/2010
(Continued)

OTHER PUBLICATIONS

International Search Report and Written Opinion for International Application No. PCT/CN2021/095148, mailed Jul. 8, 2021.
(Continued)

*Primary Examiner* — Gary A Nash
(74) *Attorney, Agent, or Firm* — Wolf, Greenfield & Sacks, P.C.

(57) ABSTRACT

A cascaded power electronic transformer and a method for controlling the same are provided. The method includes: calculating electrical angles $\theta_{i1}$ and $\theta_{kps}$ of an $s^{th}$ transformer and a compensation electrical angle $\theta_j$ of a $j^{th}$ transformer; adding the compensation electrical angle $\theta_j$ to the electrical angle $\theta_{kps}$ of the $j^{th}$ transformer, to obtain a compensated electrical angle $\theta_{kps}$ of the $j^{th}$ transformer; and calculating a square wave of a bridge arm voltage of each of the m primary converters and the r secondary converters of the $s^{th}$ transformer based on the electrical angle $\theta_{i1}$ and the electrical angle $\theta_{kps}$ of the $s^{th}$ transformer after compensation.

12 Claims, 7 Drawing Sheets

(51) Int. Cl.
- *H02M 3/335* (2006.01)
- *H02M 7/217* (2006.01)
- *H02M 7/483* (2007.01)
- *H02M 7/49* (2007.01)

(52) U.S. Cl.
CPC ........ *H02M 3/33576* (2013.01); *H02M 7/217* (2013.01); *H02M 7/483* (2013.01); *H02M 7/49* (2013.01)

(56) References Cited

U.S. PATENT DOCUMENTS

| | | | | |
|---|---|---|---|---|
| 2008/0198637 | A1* | 8/2008 | Meysenc | H02M 7/219 363/67 |
| 2016/0352229 | A1 | 12/2016 | Norimatsu et al. | |
| 2019/0052177 | A1* | 2/2019 | Lu | H02M 7/217 |
| 2019/0238088 | A1* | 8/2019 | Zhuang | H02J 3/46 |
| 2019/0280586 | A1 | 9/2019 | Chen et al. | |

FOREIGN PATENT DOCUMENTS

| | | |
|---|---|---|
| CN | 102163927 A | 8/2011 |
| CN | 103956911 A | 7/2014 |
| CN | 105591548 A | 5/2016 |
| CN | 106169873 A | 11/2016 |
| CN | 106533191 A | 3/2017 |
| CN | 109067195 A | 12/2018 |
| CN | 109286330 A | 1/2019 |
| CN | 112202340 A | 1/2021 |
| JP | 2016-220480 A | 12/2016 |

OTHER PUBLICATIONS

Liu Junya, Research on voltage and current balance control of cascaded power electronic transformer. Dissertation for Master Degree in Engineering, Shenzhen Graduate School. Jun. 2016: 1-73.

Sen et al., Integrated current balancing transformer for primary parallel isolated boost converter. Proceedings of the 2011 14th European Conference on Power Electronics and Applications. Aug. 30, 2011:1-7.

Wang et al., Voltage and power balance control for cascaded multilevel converter based power electronic transformer. Transactions of China Electrotechnical Society. Nov. 2016;31(22):92-9.

* cited by examiner

CASCADED POWER ELECTRONIC TRANSFORMER AND CONTROL METHOD THEREFOR

This application is a national stage filing under 35 U.S.C. § 371 of International Patent Application Serial No. PCT/CN2021/095148, filed May 21, 2021, which claims priority to Chinese Patent Application No. 202011069564.2, entitled "CASCADED POWER ELECTRONIC TRANSFORMER AND CONTROL METHOD THEREFOR", filed on Sep. 30, 2020 with the China National Intellectual Property Administration The contents of these applications are incorporated herein by reference in their entireties.

FIELD

The present disclosure relates to the technical field of power electronics, and in particular to a cascaded power electronic transformer and a method for controlling the cascaded power electronic transformer.

BACKGROUND

FIG. 1 shows a cascaded power electronic transformer. In the topology of the cascaded power electronic transformer, each phase includes n transformers. Each of the n transformers has m primary windings and r secondary windings, where n+m≥3, and r≥1. Each of the m primary windings is connected in series with a DC/AC converter. Each of the r secondary windings is connected in series with an AC/DC converter. Direct current sides of the n*m DC/AC converters each are connected to a pre-converter, and then are connected in series to form an input port of the cascaded power electronic transformer. The cascaded power electronic transformer has one or more output ports each formed as follows. At least one AC/DC converter is selected from a secondary-side of each transformer, and then direct current sides of these selected AC/DC converters are connected in series and parallel to obtain the output port.

However, there is currently no solution for equalizing power among primary windings in the cascaded power electronic transformer.

SUMMARY

In view of this, a cascaded power electronic transformer and a method for controlling the cascaded power electronic transformer are provided according to the present disclosure, so as to equalize power among primary windings in the cascaded power electronic transformer.

A method for controlling a cascaded power electronic transformer is provided. Each phase of the cascaded power electronic transformer includes n transformers. Each of the n transformers includes m primary windings and r secondary windings, where n≥2, m≥2, and r≥1. Each of the m primary windings is connected in series with a DC/AC converter. Each of the r secondary windings is connected in series with an AC/DC converter. Direct current sides of the n*m DC/AC converters each are connected to a pre-converter and are connected in series to form an input port of the cascaded power electronic transformer. The cascaded power electronic transformer includes one or more output ports each formed by selecting at least one AC/DC converter from a secondary-side of each of the n transformers and connecting direct current sides of the selected AC/DC converters in series and parallel.

The method for controlling a cascaded power electronic transformer includes: calculating electrical angles $\theta_{i1}$ and $\theta_{kps}$ of an $s^{th}$ transformer and a compensation electrical angle $\theta_j$ of a $j^{th}$ transformer, where s=1, 2, . . . , n; in a same transformer, a DC/AC converter connected in series with an $i^{th}$ primary winding of the transformer is defined as an $i^{th}$ primary converter, and an AC/DC converter connected in series with a $k^{th}$ secondary winding of the transformer is defined as a $k^{th}$ secondary converter; a bridge arm voltage of a first primary converter of the transformer serves as a reference voltage, an electrical angle between a bridge arm voltage of the $i^{th}$ primary converter and the reference voltage is denoted as $\theta_{i1}$, where i=2, 3, . . . , m, and an electrical angle between a bridge arm voltage of the $k^{th}$ secondary converter and the reference voltage is denoted as $\theta_{kps}$, where k=1, 2, . . . , r; voltage references corresponding to respective transformers at the same phase are equal, and a voltage reference of a transformer at one phase differs from a voltage reference of a transformer at another phase by $2\pi/3$ electrical angle, wherein the two transformers have the same ordinal number in respective phases; a compensation angle between a bridge arm voltage of a primary converter and a bridge arm voltage of a secondary converter of the $j^{th}$ transformer is denoted as $\theta_j$, where j=2, 3, . . . , n; a sum of direct current link currents of the m primary converters of the $s^{th}$ transformer is calculated by a balance control current loop corresponding to the $i^{th}$ primary winding of the $s^{th}$ transformer, and is divided by m to obtain a current reference, the current reference is subtracted from a direct current link current $I_{dcij}$ of the $i^{th}$ primary converter of the $s^{th}$ transformer, and the electrical angle $\theta_{i1}$ of the $s^{th}$ transformer is outputted via a first regulator; and in order to equalize power among different secondary converters at a same output port by modifying electrical angles $\theta_{1ps}, \theta_{2ps}, \ldots, \theta_{rps}$, a sum of direct current link currents of the m*n primary converters at the phase is calculated by a transformer balance control current loop corresponding to the $j^{th}$ transformer, and is divided by n to obtain a current reference, the current reference is subtracted from a sum of direct current link currents of the m primary converters of the $j^{th}$ transformer, and the compensation electrical angle $\theta_j$ is outputted via a second regulator; adding the compensation electrical angle $\theta_j$ to the electrical angle $\theta_{kps}$ of the $j^{th}$ transformer, to obtain a compensated electrical angle $\theta_{kps}$ of the $j^{th}$ transformer; and calculating a square wave of a bridge arm voltage of each of the m primary converters and the r secondary converters of the $s^{th}$ transformer based on the electrical angle $\theta_{i1}$ and the electrical angle $\theta_{kps}$ of the $s^{th}$ transformer after compensation.

Optionally, the calculating a square wave of a bridge arm voltage of each of the m primary converters and the r secondary converters of the $s^{th}$ transformer based on the electrical angle $\theta_{i1}$ and the electrical angle $\theta_{kps}$ of the $s^{th}$ transformer after compensation includes: calculating a duty cycle $D_1$ of the first primary converter of the $s^{th}$ transformer based on an electrical angle $\theta_{11}$ and the electrical angle $\theta_{kps}$ of the $s^{th}$ transformer, and calculating a duty ratio $D_i$ of the $i^{th}$ primary converter of the $s^{th}$ transformer based on the electrical angle $\theta_{i1}$ and the electrical angle $\theta_{kps}$ of the $s^{th}$ transformer, where $\theta_{11}$ represents an electrical angle between the bridge arm voltage of the first primary converter of the $s^{th}$ transformer and itself, that is, zero; and calculating a square wave of the bridge arm voltage of the first primary converter of the $s^{th}$ transformer based on the electrical angle $\theta_{i1}$ of the $s^{th}$ transformer and the duty ratio $D_1$, calculating a square wave of the bridge arm voltage of the $i^{th}$ primary converter of the $s^{th}$ transformer based on the electrical angle $\theta_{i1}$ of the $s^{th}$ transformer and the duty ratio $D_i$, and calculating a square wave of the bridge arm voltage of the $k^{th}$ secondary converter of the $s^{th}$ transformer based on the compensated electrical angle $\theta_{kps}$ of the $s^{th}$ transformer.

Optionally, the calculating an electrical angle $\theta_{kps}$ of the $s^{th}$ transformer includes: operating a direct current link voltage loop corresponding to the $i^{th}$ primary converter of the $s^{th}$ transformer; operating a control loop corresponding to an $h^{th}$ series branch in a $g^{th}$ parallel branch at the same output port; and adding an output of the direct current link voltage loop and an output of the control loop to obtain an uncompensated electrical angle $\theta_{kps}$. The operating a direct current link voltage loop corresponding to the $i^{th}$ primary converter of the $s^{th}$ transformer includes: applying a same direct current link voltage reference $U_{dcref}$ to primary DC/AC converters of all the transformers; subtracting, by a direct current link voltage loop corresponding to the $i^{th}$ primary converter of the $s^{th}$ transformer, the direct current link voltage reference $U_{dcref}$ from the direct current link voltage $U_{dcis}$ of the $i^{th}$ primary converter; and outputting, via a third regulator, a result of the subtraction, as the output of the direct current link voltage loop. The operating a control loop corresponding to an $h^{th}$ series branch in a $g^{th}$ parallel branch at the same output port includes: determining at the output port whether the output port is to output a constant voltage or constant current. In a case that the output port is to output a constant voltage, a voltage reference Uoref of the output port is divided by q, to obtain a voltage reference of each series branch, so as to equalize a voltage among the series branches; the voltage reference $U_{oref}$ of each series branch is divided by q and minus an actual voltage $U_{oh}$, and is outputted via a fourth regulator; an output result of the fourth regulator is multiplied by 1/p to obtain a current reference of each parallel branch, so as to equalize a current among the parallel branches; and the current reference is compared with a current $I_{ogh}$ outputted by the $h^{th}$ series branch in the $g^{th}$ parallel branch, and a difference is outputted by a fifth regulator, as the output of the control loop, wherein g=1, 2 . . . , p and h=1, 2, . . . , q. In a case that the output port is to output a constant current, an output power reference Poref of the output port is divided by p*q*$U_o$ to obtain a current reference of each parallel branch in each series branch, so as to equalize a current among the parallel branches; the current reference is subtracted from an output current $I_{ogh}$ of the $h^{th}$ series branch in the $g^{th}$ parallel branch, and a result of the subtraction is outputted via a sixth regulator; voltages of the q series branches are added together and the obtained sum is divided by q to obtain a voltage reference of each series branch, so as to equalize a voltage among the series branches; the voltage reference is subtracted from a voltage $U_{ogh}$ outputted by the $h^{th}$ series branch in the $g^{th}$ parallel branch, and a result of the subtraction is outputted via a seventh regulator; and a sum of the output of the sixth regulator and the output of the seventh regulator is determined as the output of the control loop.

Optionally, the method for controlling a cascaded power electronic transformer further includes: performing, for each of the n transformers, power frequency second harmonic suppression on a direct current link of each primary converter of the transformer. The performing, for each of the n transformers, power frequency second harmonic suppression on a direct current link of each primary converter of the transformer includes: extracting, by a 100 Hz second-order band-pass filter, a power frequency second harmonic component from a direct current of the primary converter; subtracting zero serving as a reference from the power frequency second harmonic component serving as a feedback; and outputting a result of subtraction via a proportional resonant controller with a resonant frequency of 100 Hz, and adding the result to an uncompensated electrical angle $\theta_{kps}$ of the converter.

Optionally, the calculation of $\theta_{i1}$ is not performed in the method for controlling a cascaded power electronic transformer in a case of n≥2 and m=1. Alternatively, the calculation of $\theta_j$ is not performed in the method for controlling a cascaded power electronic transformer in a case of n=1 and m≥2.

A cascaded power electronic transformer includes a main circuit and a controller. Each phase of the cascaded power electronic transformer includes n transformers. Each of the n transformers includes m primary windings and r secondary windings, where n≥2, m≥2, and r≥1. Each of the m primary windings is connected in series with a DC/AC converter. Each of the r secondary windings is connected in series with an AC/DC converter. Direct current sides of the n*m DC/AC converters each are connected to a pre-converter and are connected in series to form an input port of the cascaded power electronic transformer. The cascaded power electronic transformer includes one or more output ports each formed by selecting at least one AC/DC converter from a secondary-side of each of the n transformers and connecting direct current sides of the selected AC/DC converters in series and parallel.

The controller includes a processor, a memory and a program stored in the memory and executable on the processor, and the processor is configured to, when executing the program: calculate electrical angles $\theta_{i1}$ and $\theta_{kps}$ of an $s^{th}$ transformer and a compensation electrical angle $\theta_j$ of a $j^{th}$ transformer, where s=1, 2, . . . , n; in a same transformer, a DC/AC converter connected in series with an $i^{th}$ primary winding of the transformer is defined as an $i^{th}$ primary converter, and an AC/DC converter connected in series with a $k^{th}$ secondary winding of the transformer is defined as a $k^{th}$ secondary converter; a bridge arm voltage of a first primary converter of the transformer serves as a reference voltage, an electrical angle between a bridge arm voltage of the $i^{th}$ primary converter and the reference voltage is denoted as $\theta_{i1}$, wherein i=2, 3, . . . , m, and an electrical angle between a bridge arm voltage of the $k^{th}$ secondary converter and the reference voltage is denoted as $\theta_{kps}$, where k=1, 2, . . . , r; voltage references corresponding to respective transformers at the same phase are equal, and a voltage reference of a transformer at one phase differs from a voltage reference of a transformer at another phase by 2π/3 electrical angle, wherein the two transformers have the same ordinal number in respective phases; a compensation angle between a bridge arm voltage of a primary converter and a bridge arm voltage of a secondary converter of the $j^{th}$ transformer is denoted as $\theta_j$, where j=2, 3, . . . , n; a sum of direct current link currents of the m primary converters of the $s^{th}$ transformer is calculated by a balance control current loop corresponding to the $i^{th}$ primary winding of the $s^{th}$ transformer, and is divided by m to obtain a current reference, the current reference is subtracted from a direct current link current $I_{dcis}$ of the $i^{th}$ primary converter of the $s^{th}$ transformer, and the electrical angle $\theta_{i1}$ of the $s^{th}$ transformer is outputted via a first regulator; and in order to equalize power among different secondary converters at a same output port by modifying electrical angles $\theta_{1ps}, \theta_{2ps}, \ldots, \theta_{rps}$, a sum of direct current link currents of the m*n primary converters at the phase is calculated by a transformer balance control current loop corresponding to the $j^{th}$ transformer, and is divided by n to obtain a current reference, the current reference is subtracted from a sum of direct current link currents of the m primary converters of the $j^{th}$ transformer, and the compensation electrical angle $\theta_j$ is outputted via a second regulator; add the compensation electrical angle $\theta_j$ to the electrical angle $\theta_{kps}$ of the $j^{th}$ transformer, to obtain a compensated electrical angle $\theta_{kps}$ of the $j^{th}$ transformer; and calculate a square wave of a bridge arm voltage of each of the m primary converters and the r secondary converters of the $s^{th}$ transformer based on the electrical angle $\theta_{i1}$ and the electrical angle $\theta_{kps}$ of the $s^{th}$ transformer after compensation.

Optionally, in order to calculate a square wave of a bridge arm voltage of each of the m primary converters and the r secondary converters of the $s^{th}$ transformer based on the electrical angle $\theta_{i1}$ and the electrical angle $\theta_{kps}$ of the $s^{th}$ transformer after compensation, the processor is configured to: calculate a duty cycle $D_1$ of the first primary converter of the $s^{th}$ transformer based on an electrical angle $\theta_{11}$ and the electrical angle $\theta_{kps}$ of the $s^{th}$ transformer, and calculate a duty ratio $D_i$ of the $i^{th}$ primary converter of the $s^{th}$ transformer based on the electrical angle $\theta_{i1}$ and the electrical angle $\theta_{kps}$ of the $s^{th}$ transformer, wherein $\theta_1$ represents an electrical angle between the bridge arm voltage of the first primary converter of the $s^{th}$ transformer and itself, that is, zero; and calculate a square wave of the bridge arm voltage of the first primary converter of the $s^{th}$ transformer based on the electrical angle $\theta_{11}$ of the $s^{th}$ transformer and the duty ratio $D_1$, calculate a square wave of the bridge arm voltage of the $i^{th}$ primary converter of the $s^{th}$ transformer based on the electrical angle $\theta_{i1}$ of the $s^{th}$ transformer and the duty ratio $D_i$, and calculate a square wave of the bridge arm voltage of the $k^{th}$ secondary converter of the $s^{th}$ transformer based on the compensated electrical angle $\theta_{kps}$ of the $s^{th}$ transformer.

Optionally, in order to calculate the electrical angle $\theta_{kps}$ of the $s^{th}$ transformer, the processor is configured to: operate a direct current link voltage loop corresponding to the $i^{th}$ primary converter of the $s^{th}$ transformer; operate a control loop corresponding to an $h^{th}$ series branch in a $g^{th}$ parallel branch at the same output port; and add an output of the direct current link voltage loop and an output of the control loop to obtain an uncompensated electrical angle $\theta_{kps}$. In order to operate the direct current link voltage loop corresponding to the $i^{th}$ primary converter of the $s^{th}$ transformer, the processor is configured to: apply a same direct current link voltage reference $U_{dcref}$ to primary DC/AC converters of all the transformers; subtract, by a direct current link voltage loop corresponding to the $i^{th}$ primary converter of the $s^{th}$ transformer, the direct current link voltage reference $U_{dcref}$ from the direct current link voltage $U_{dcis}$ of the $i^{th}$ primary converter; and output, via a third regulator, a result of the subtraction, as the output of the direct current link voltage loop. In order to operate the control loop corresponding to the $h^{th}$ series branch in the $g^{th}$ parallel branch at the same output port, the processor is configured to: determine at the output port whether the output port is to output a constant voltage or constant current. In a case that the output port is to output a constant voltage, a voltage reference Uoref of the output port is divided by q, to obtain a voltage reference of each series branch, so as to equalize a voltage among the series branches. The voltage reference $U_{oref}$ of each series branch is divided by q and minus an actual voltage $U_{oh}$, and is outputted via a fourth regulator. An output result of the fourth regulator is multiplied by 1/p to obtain a current reference of each parallel branch, so as to equalize a current among the parallel branches. The current reference is compared with a current $I_{ogh}$ outputted by the $h^{th}$ series branch in the $g^{th}$ parallel branch, and a difference is outputted by a fifth regulator, as the output of the control loop, where g=1, 2 . . . , p and h=1, 2, . . . , q. In a case that the output port is to output a constant current, an output power reference Poref of the output port is divided by $p*q*U_o$ to obtain a current reference of each parallel branch in each series branch, so as to equalize a current among the parallel branches. The current reference is subtracted from an output current $I_{ogh}$ of the $h^{th}$ series branch in the $g^{th}$ parallel branch, and a result of the subtraction is outputted via a sixth regulator. voltages of the q series branches are added together and the obtained sum is divided by q to obtain a voltage reference of each series branch, so as to equalize a voltage among the series branches. The voltage reference is subtracted from a voltage $U_{ogh}$ outputted by the $h^{th}$ series branch in the $g^{th}$ parallel branch, and a result of the subtraction is outputted via a seventh regulator. a sum of the output of the sixth regulator and the output of the seventh regulator is determined as the output of the control loop.

Optionally, the processor is further configured to: perform, for each of the n transformers, power frequency second harmonic suppression on a direct current link of each primary converter of the transformer. In order to perform, for the transformer, the power frequency second harmonic suppression on the direct current link of the primary converter of the transformer, the processor is configured to: extract, via a 100 Hz second-order band-pass filter, a power frequency second harmonic component from a direct current of the primary converter; subtract zero serving as a reference from the power frequency second harmonic component serving as a feedback; and output a result of subtraction via a proportional resonant controller with a resonant frequency of 100 Hz, and adding the result to an uncompensated electrical angle $\theta_{kps}$ of the converter.

Optionally, the processor of the cascaded power electronic transformer is configured to skip the calculation of $\theta_{i1}$ in a case of n≥2 and m=1.

Optionally, the processor of the cascaded power electronic transformer is configured to skip the calculation of $\theta_j$ in a case of n=1 and m≥2.

It can be seen from the above technical solutions that primary windings in the same transformer are electrically connected to each other via DC/AC converters and pre-converters. Therefore, the electrical angles $\theta_{21}, \theta_{31}, \ldots, \theta_{m1}$ are modified, so that power of the different primary windings in the same transformer flows, thereby equalizing power among the different primary windings in the same transformer. For any output port of the cascaded power electronic transformer, at least one secondary winding is selected from each transformer, and then the selected secondary windings are electrically connected to each other via AC/DC converters. Therefore, electrical angles $\theta_{1ps}, \theta_{2ps}, \ldots, \theta_{rps}$ are modified, so that power of the different secondary windings at the same output port flows, thereby equalizing power among the different secondary converters at the same output port. Further, compensation electrical angles $\theta_2, \theta_3, \ldots \theta_n$ are added to electrical angles between bridge arm voltages of the primary converters and bridge arm voltages of the secondary converters of different transformers, respectively, so as to equalize power among different transformers according to the embodiment of the present disclosure. As long as the power among different primary windings in the same transformer and the power among different transformers are balanced, the power among all primary windings in the whole cascaded power electronic transformer is balanced according to the embodiment of the present disclosure.

BRIEF DESCRIPTION OF THE DRAWINGS

In order to more clearly illustrate the technical solutions in the embodiments of the present disclosure or in the existing technology, the drawings to be used in the embodiments or the description of the existing technology are briefly introduced below. It is apparent that the drawings in the following description show only some embodiments of the present disclosure. For those skilled in the art, other drawings may also be obtained based on the provided drawings with out any creative effort.

DETAILED DESCRIPTION OF EMBODIMENTS

The technical solutions in the embodiments of the present disclosure will be clearly and completely described below with reference to the drawings in the embodiments of the present disclosure. It is apparent that the described embodiments are only some rather than all the embodiments of the present disclosure. All other embodiments, obtained by those skilled in the art based on the embodiments in the present disclosure with out any creative work, fall with in the scope of protection of the present disclosure.

Figure 1:
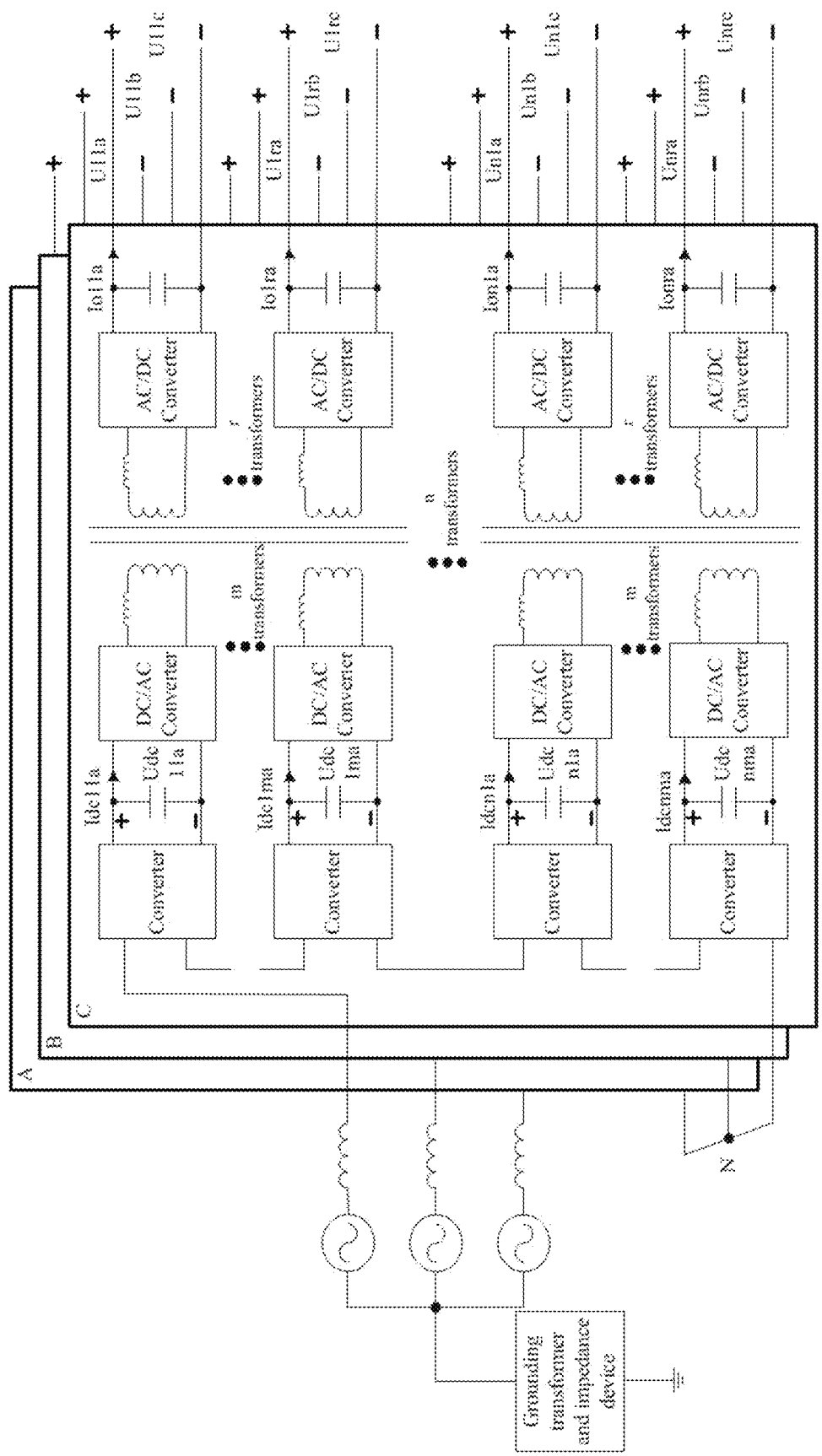
FIG. 1 is a schematic structural diagram illustrating a cascaded power electronic transformer.
Figure 2:
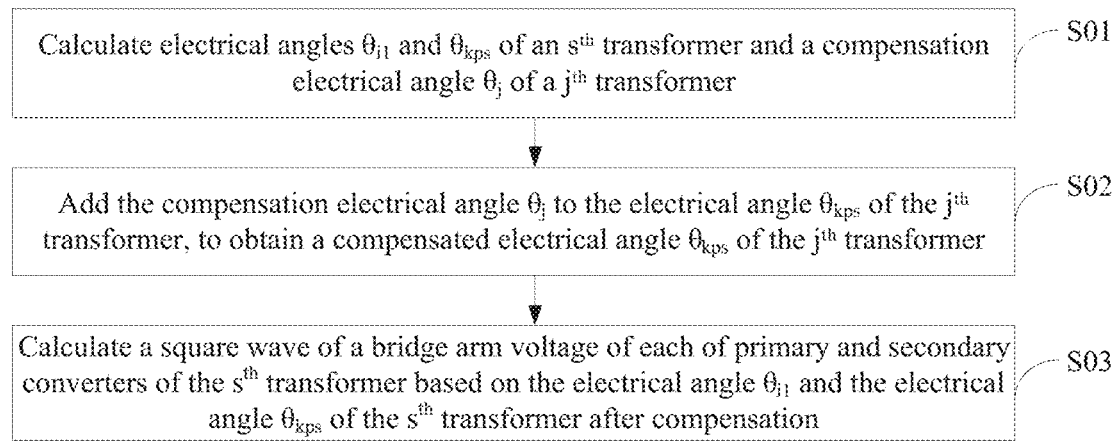
FIG. 2 is a flow chart illustrating a method for controlling the cascaded power electronic transformer according to an embodiment of the present disclosure.

A method for controlling a cascaded power electronic transformer is provided according to an embodiment of the present disclosure. The method is applied to the cascaded power electronic transformer shown in FIG. 1. In a case of n≥2 and m≥2, the method for controlling the cascaded power electronic transformer includes the following steps S01 to S03.

In step S01, electrical angles $\theta_{i1}$ and $\theta_{kps}$ of an $s^{th}$ transformer and a compensation electrical angle $\theta_j$ of a $j^{th}$ transformer are calculated, where s=1, 2, . . . , n.

In step S02, the compensation electrical angle $\theta_j$ is added to the electrical angle $\theta_{kps}$ of the $j^{th}$ transformer, to obtain a compensated electrical angle $\theta_{kps}$ of the $j^{th}$ transformer.

For ease of description, for a single phase in the topology of the cascaded power electronic transformer, a DC/AC converter connected in series with an $i^{th}$ primary winding of the $s^{th}$ transformer is referred to as an $i^{th}$ primary converter of the $s^{th}$ transformer for short, and an AC/DC converter connected in series with a $k^{th}$ secondary winding of the $s^{th}$ transformer is referred to as a $k^{th}$ secondary converter of the $s^{th}$ transformer for short.

Primary windings in the same transformer are electrically connected to each other via DC/AC converters and pre-converters. Therefore, the electrical angle between bridge arm voltages of different primary converters in the same transformer is modified, so that power of the different primary windings in the same transformer flows, thereby equalizing power among the different primary windings in the same transformer.

Further, for any output port of the cascaded power electronic transformer, at least one secondary winding is selected from each transformer, and then the selected secondary windings are electrically connected to each other via AC/DC converters. Therefore, an electrical angle between bridge arm voltages of different secondary converters at the same output port is modified, so that power of the different secondary windings at the same output port flows, thereby equalizing power among the different secondary converters at the same output port.

In the embodiment according to the present disclosure, a bridge arm voltage of the first primary converter in each transformer in the cascaded power electronic transformer serves as a reference voltage (where reference voltages corresponding to respective transformers at the same phase are equal, and there is a difference of $2\pi/3$ electrical angle in the reference voltage between a transformer at one phase and a transformer at another phase that have the same ordinal number). An electrical angle between a bridge arm voltage of the $i^{th}$ primary converter and the reference voltage is denoted as $\theta_{i1}$, where i=2, 3, . . . , m. An electrical angle between a bridge arm voltage of the $k^{th}$ secondary converter and the reference voltage is denoted as $\theta_{kps}$, where k=1, 2, . . . , r. The electrical angle between bridge arm voltages of different primary converters in the same transformer is modified by modifying electrical angles $\theta_{21}$, $\theta_{31}$, . . . , $\theta_{m1}$, thereby equalizing power of the different primary windings in the same transformer. The electrical angle between bridge arm voltages of different secondary converters at the same output port is modified by modifying electrical angles $\theta_{1ps}$, $\theta_{2ps}$, . . . , $\theta_{rps}$, thereby equalizing power among the different secondary converters at the same output port.

A difference in line parameter between transformers may result in imbalance of power in a case that an electrical angle applied between a bridge arm voltage of a primary converter and a bridge arm voltage of a secondary converter of one transformer is the same as an electrical angle applied between a bridge arm voltage of a primary converter and a bridge arm voltage of a secondary converter of another transformer. In order to equalize power among the different secondary converters at the same output port by modifying the electrical angles $\theta_{1ps}$, $\theta_{2ps}$, . . . , $\theta_{rps}$, the first transformer serves as a reference. Compensation electrical angles to be added to electrical angles $\theta_{1ps}$, $\theta_{2ps}$, . . . , $\theta_{rps}$ of other n−1 transformers, respectively (where the compensation electrical angles respectively added to the electrical angles $\theta_{1ps}$, $\theta_{2ps}$, . . . , $\theta_{rps}$ corresponding to the same transformer are equal, and the compensation electrical angles to be added to the electrical angles $\theta_{1ps}$, $\theta_{2ps}$, . . . , $\theta_{rps}$ corresponding to different transformers depend on degrees of offset in power of the transformers, respectively), thereby equalizing power among different transformers. For ease of description, a compensation electrical angle between the bridge arm voltage of the primary converter and the bridge arm voltage of the secondary converter of a $j^{th}$ transformer is denoted as $\theta_j$, where j=2, 3, . . . , n.

As long as the power among different primary windings in the same transformer and the power among different transformers are balanced, the power among all primary windings in the whole cascaded power electronic transformer is balanced.

Based on the above description, each of the m−1 primary windings of each transformer is provided with a primary winding balance control current loop (referring to the reference numeral 100 in FIG. 3) according to the embodiment of the present disclosure. In order to equalize power among the different secondary converters at the same output port by modifying the electrical angles $\theta_{1ps}, \theta_{2ps}, \ldots, \theta_{rps}$, each of the n−1 transformers in the same phase is provided with a transformer balance control current loop (referring to the reference numeral 200 in FIG. 3). The operation principle is described below in conjunction with FIG. 3.

The balance control current loop corresponding to the $i^{th}$ primary winding of the $s^{th}$ transformer calculates a sum of a direct current link currents of the m primary converters of the $s^{th}$ transformer and divides the sum by m to obtain a current reference, subtracts the current reference from a direct current link current $I_{dcis}$ of the $i^{th}$ primary converter of the $s^{th}$ transformer, and outputs the electrical angle $\theta_{i1}$ of the $s^{th}$ transformer via a first regulator (for example, a PI regulator).

The transformer balance control current loop corresponding to the $j^{th}$ transformer calculates a sum of direct current link currents of m*n primary converters at each phase and divides the sum by n to obtain a current reference, subtracts the current reference from a sum of direct current link currents of the m primary converters of the $j^{th}$ transformer, and outputs an electrical angle $\theta_j$ via a second regulator (for example, a PI regulator). Then, the compensation electrical angle $\theta_j$ is added to the electrical angle $\theta_{kps}$ of the $j^{th}$ transformer to obtain the compensated electrical angle $\theta_{kps}$ of the $j^{th}$ transformer.

In step S03, after compensation, a square wave of a bridge arm voltage of each of the primary and secondary converters of the $s^{th}$ transformer is calculated based on the electrical angle $\theta_{i1}$ and the electrical angle $\theta_{kps}$ of the $s^{th}$ transformer.

Based on the calculation in step S03, the electrical angle $\theta_{i1}$ of the $s^{th}$ transformer, the electrical angle $\theta_{kps}$ of the first transformer and the compensated electrical angle $\theta_{kps}$ of the $j^{th}$ transformer calculated in steps S01 to step S02 are taken into consideration for controlling the cascaded power electronic transformer. Therefore, the power among different primary windings in the same transformer and the power among different transformers are balanced.

After the compensation, the square wave of the bridge arm voltage of each of the primary and secondary converters of the $s^{th}$ transformer is calculated based on the electrical angle $\theta_{i1}$ and the electrical angle $\theta_{kps}$ of the $s^{th}$ transformer as follows.

Figure 4:
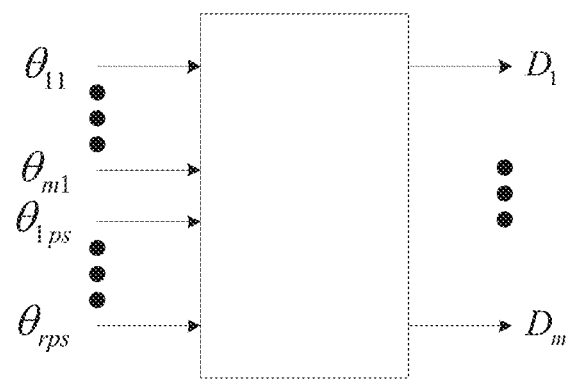
FIG. 4 is a schematic block diagram illustrating calculation of a duty cycle $D_i$.
Figure 5:
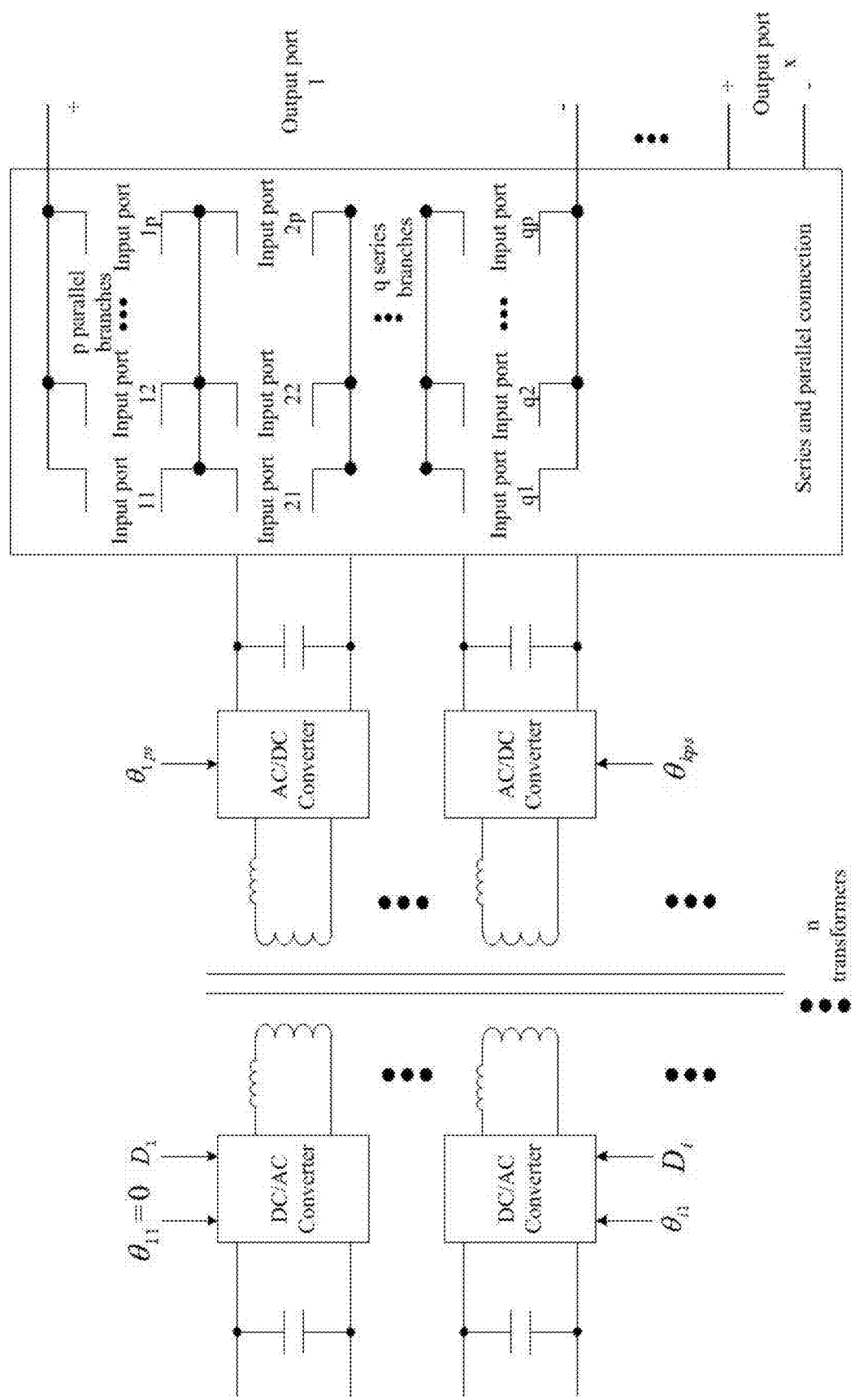
FIG. 5 is a schematic block diagram illustrating a correspondence between a converter and each of an electrical angle $\theta_{i1}$, the duty cycle $D_i$ as well as an electrical angle $\theta_{kps}$.

After the compensation, a duty cycle $D_1$ of the first primary converter of the $s^{th}$ transformer is calculated based on the electrical angle $\theta_{i1}$ of the $s^{th}$ transformer (representing an electrical angle between the bridge arm voltage of the first primary converter of the $s^{th}$ transformer and itself, that is, zero) and the electrical angle $\theta_{kps}$, and a duty ratio $D_i$ of the $i^{th}$ primary converter of the $s^{th}$ transformer is calculated based on the electrical angle $\theta_{i1}$ of the $s^{th}$ transformer and the electrical angle $\theta_{kps}$, as shown in FIG. 4. Then, the square wave of the bridge arm voltage of the first primary converter of the $s^{th}$ transformer is calculated based on the electrical angle $\theta_{11}$ of the $s^{th}$ transformer and the duty ratio $D_1$, the square wave of the bridge arm voltage of the $i^{th}$ primary converter of the $s^{th}$ transformer is calculated based on the electrical angle $\theta_{i1}$ of the $s^{th}$ transformer and the duty ratio $D_i$, and the square wave of the bridge arm voltage of the $k^{th}$ secondary converter of the $s^{th}$ transformer is calculated based on the electrical angle $\theta_{kps}$ of the $s^{th}$ transformer, as shown in FIG. 5.

Figure 6:
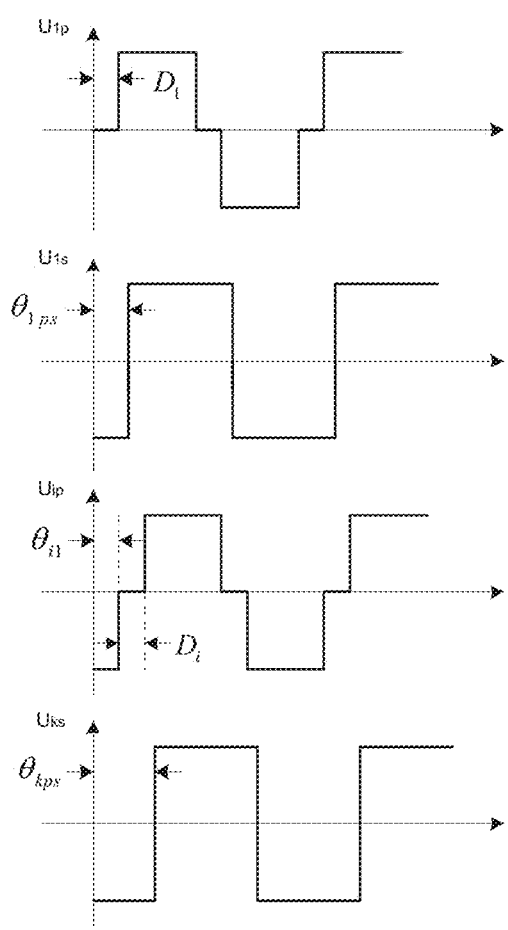
FIG. 6 is a diagram illustrating sequence voltages between windings of the same transformer.

FIG. 6 illustrates sequence voltages between windings of the same transformer. The waveform of the bridge arm voltage of the first primary converter, the waveform of the bridge arm voltage of the first secondary converter, the waveform of the bridge arm voltage of the $i^{th}$ primary converter, and the waveform of the bridge arm voltage of the $k^{th}$ secondary converter are shown sequentially from top to bottom.

It can be seen from all the above descriptions of the technical solutions in the embodiments of the present disclosure, primary windings in the same transformer are electrically connected to each other via DC/AC converters and pre-converters. Therefore, the electrical angles $\theta_{21}, \theta_{31}, \ldots, \theta_{m1}$ are modified, so that power of the different primary windings in the same transformer flows, thereby equalizing power among the different primary windings in the same transformer. For any output port of the cascaded power electronic transformer, at least one secondary winding is selected from each transformer, and then the selected secondary windings are electrically connected to each other via AC/DC converters. Therefore, electrical angles $\theta_{1ps}, \theta_{2ps}, \ldots, \theta_{rps}$ are modified, so that power of the different secondary windings at the same output port flows, thereby equalizing power among the different secondary converters at the same output port. Further, compensation electrical angles $\theta_2, \theta_3, \ldots \theta_n$ are added to electrical angles between bridge arm voltages of the primary converters and bridge arm voltages of the secondary converters of different transformers, respectively, so as to equalize power among different transformers according to the embodiment of the present disclosure. As long as the power among different primary windings in the same transformer and the power among different transformers are balanced, the power among all primary windings in the whole cascaded power electronic transformer is balanced according to the embodiment of the present disclosure.

It should be noted that the calculation of the electrical angle $\theta_{kps}$ of the $s^{th}$ transformer, that is, equalization of power among different secondary windings under the same output port by modifying the electrical angle $\theta_{1ps}, \theta_{2ps}, \ldots, \theta_{rps}$ may be directly implemented in the existing manner.

Figure 7:
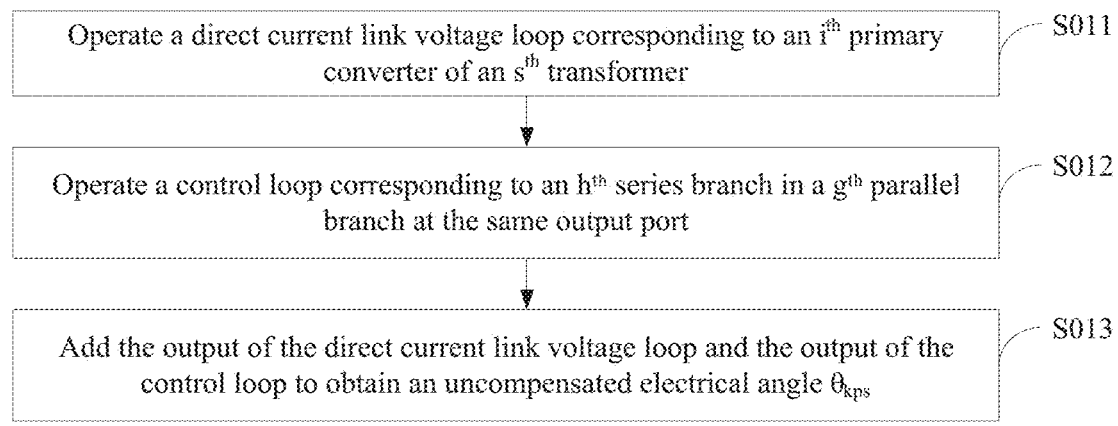
FIG. 7 is a flow chart illustrating calculation of an electrical angle $\theta_{kps}$ of an $s^{th}$ transformer according to an embodiment of the present disclosure.

It is assumed that all AC/DC converters at the same output port are connected in series and parallel to obtain p parallel branches and q series branches, where p≥1, and q≥1. In order to equalize a current among the p parallel branches and equalize a voltage among the q series branches at the same output port, the electrical angle $\theta_{kps}$ of the $j^{th}$ transformer may be calculated as follows. As shown in FIG. 7, the calculation of the electrical angle $\theta_{kps}$ of the $j^{th}$ transformer includes the following steps S011 to S013.

In step S011, the direct current link voltage loop corresponding to the $i^{th}$ primary converter of the $s^{th}$ transformer operates.

The primary DC/AC converters of all the transformers are applied with the same direct current link reference voltage $U_{dcref}$. The direct current link voltage loop corresponding to the $i^{th}$ primary converter of the $s^{th}$ transformer (referring to the reference numeral 300 in FIG. 3) subtracts the direct current link reference voltage $U_{dcref}$ from the direct current link voltage $U_{dcis}$ of the $i^{th}$ primary converter, and outputs a result via a third regulator (for example, a PI regulator), as an output of the direct current link voltage loop.

In step S012, a control loop corresponding to an $h^{th}$ series branch in a $g^{th}$ parallel branch at the same output port operates.

Figure 3:
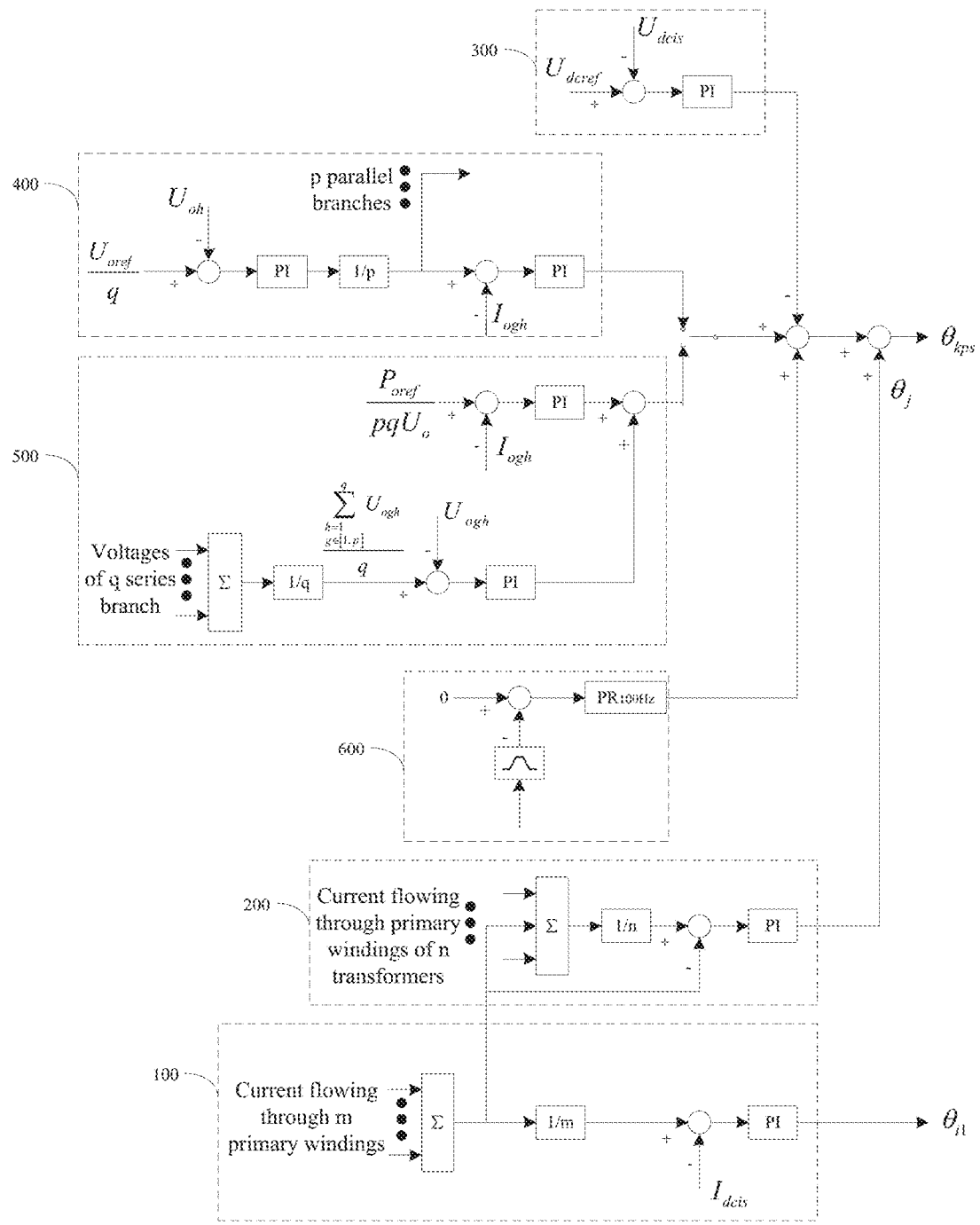
FIG. 3 is a schematic block diagram illustrating control on the cascaded power electronic transformer according to an embodiment of the present disclosure.

It is determined at the output port whether the output port is to output a constant voltage or constant current. The reference numeral 400 in FIG. 3 illustrates a block diagram of the control loop corresponding to the constant voltage. The reference numeral 500 in FIG. 3 illustrates a block diagram of the control loop corresponding to the constant current.

In a case that the output port is to output a constant voltage (that is, operates in a voltage mode), the voltage reference Uoref of the output port is divided by q, to obtain a voltage reference of each series branch, so as to equalize the voltage among the series branches. The voltage reference $U_{oref}$ of each series branch is divided by q and then minus an actual voltage $U_{oh}$, and is outputted via a fourth regulator (for example, a PI regulator). The output result of the fourth regulator is multiplied by 1/p to obtain a current reference of each parallel branch, so as to equalize the current among the parallel branches. The current reference is compared with a current $I_{ogh}$, outputted by the $h^{th}$ series branch in the $g^{th}$ parallel branch, and a difference is outputted by a fifth regulator (for example, a PI regulator), as an output of the control loop, where g=1, 2 . . . , p and h=1, 2, . . . , q.

In a case that the output port is to output a constant current (that is, operates in a current mode), an output power reference Poref of the output port is divided by p*q*$U_o$ to obtain a current reference of each parallel branch in each series branch, so as to equalize the current among the parallel branches. The current reference is subtracted from an output current $I_{ogh}$ of the $h^{th}$ series branch in the $g^{th}$ parallel branch, and then is outputted via a sixth regulator (for example, a PI regulator). Further, voltages of the q series branches are added together and the sum is divided by q to obtain a voltage reference of each series branch, so as to equalize the voltage among the series branches. The voltage reference is subtracted from a voltage $U_{ogh}$ outputted by the $h^{th}$ series branch in the $g^{th}$ parallel branch, and then is outputted via a seventh regulator (for example, a PI regulator). A sum of the output of the sixth regulator and the output of the seventh regulator is determined as the output of the control loop.

In step S013, the output of the direct current link voltage loop and the output of the control loop are added to obtain the uncompensated electrical angle $\theta_{kps}$.

Optionally, the method for controlling a cascaded power electronic transformer further includes: for each of the n transformers, performing power frequency second harmonic suppression on a direct current link of each primary converter of the transformer (referring to the reference numeral 600 in FIG. 3). The power frequency second harmonic suppression is performed on the direct current link of the primary converter of the transformer as follows. A 100 Hz second-order band-pass filter extracts a power frequency second harmonic component from a direct current of the primary converter. The power frequency second harmonic component serving as a feedback minus zero serving as a reference, and the result is outputted via a proportional resonant controller with a resonant frequency of 100 Hz and then is added to the uncompensated electrical angle $\theta_{kps}$ of the primary converter.

All the above embodiments are appliable to a case of n≥2 and m≥2. The calculation of $\theta_{i1}$ is not performed in a case of n≥2 and m=1. The calculation of $\theta_j$ is not performed in a case of n=1 and m≥2.

Corresponding to the above method embodiments, a cascaded power electronic transformer is further provided according to an embodiment of the present disclosure. The cascaded power electronic transformer includes a main circuit and a controller. Each phase of the main circuit includes n transformers. Each of the n transformers has m primary windings and r secondary windings, where n≥2, m≥2, and r≥1. Each of the m primary windings is connected in series with a DC/AC converter. Each of the r secondary windings is connected in series with an AC/DC converter. Direct current sides of the n*m DC/AC converters each are connected to a pre-converter, and then are connected in series to form an input port of the cascaded power electronic transformer. The cascaded power electronic transformer has one or more output ports each formed as follows. At least one AC/DC converter is selected from a secondary-side of each transformer, and then direct current sides of these selected AC/DC converters are connected in series and parallel to obtain the output port.

The controller includes a processor, a memory and a program. The program is stored in the memory and executable on the processor. The processor is configured to implement, when executing the program, the following steps: calculating electrical angles $\theta_{i1}$ and $\theta_{kps}$ of an $s^{th}$ transformer and a compensation electrical angle $\theta_j$ of a $j^{th}$ transformer, where s=1, 2, . . . , n; in a same transformer, a DC/AC converter connected in series with an $i^{th}$ primary winding of the transformer is referred to as an $i^{th}$ primary converter of the transformer for short, an AC/DC converter connected in series with a $k^{th}$ secondary winding of the transformer is referred to as a $k^{th}$ secondary converter of the transformer for short, a bridge arm voltage of the first primary converter in the transformer serves as a reference voltage, an electrical angle between a bridge arm voltage of the $i^{th}$ primary converter and the reference voltage is denoted as $\theta_{i1}$, where i=2, 3, . . . , m, and an electrical angle between a bridge arm voltage of the $k^{th}$ secondary converter and the reference voltage is denoted as $\theta_{kps}$, where k=1, 2, . . . , r; reference voltages corresponding to respective transformers at the same phase are equal, and there is a difference of 2π/3 electrical angle in the reference voltage between a transformer at one phase and a transformer at another phase that have the same ordinal number; a compensation electrical angle between the bridge arm voltage of the primary converter and the bridge arm voltage of the secondary converter of a $j^{th}$ transformer is denoted as $\theta_j$, where j=2, 3, . . . , n; a sum of direct current link currents of the m primary converters of the $s^{th}$ transformer is calculated by a balance control current loop corresponding to the $i^{th}$ primary winding of the $s^{th}$ transformer, and is divided by m to obtain a current reference, the current reference is subtracted from a direct current link current $I_{dcis}$ of the $i^{th}$ primary converter of the $s^{th}$ transformer, and the electrical angle $\theta_{i1}$ of the $s^{th}$ transformer is outputted via a first regulator; and in order to equalize power among the different secondary converters at the same output port by modifying electrical angles $\theta_{1ps}$, $\theta_{2ps}$, . . . , $\theta_{rps}$, a sum of direct current link currents of m*n primary converters at each phase is calculated by a transformer balance control current loop corresponding to the $j^{th}$ transformer, and is divided by n to obtain a current reference, the current reference is subtracted from a sum of direct current link currents of the m primary converters of the $j^{th}$ transformer, and the compensation electrical angle $\theta_j$ is outputted via a second regulator; adding the compensation electrical angle $\theta_j$ to the electrical angle $\theta_{kps}$ of the $j^{th}$ transformer, to obtain a compensated electrical angle $\theta_{kps}$ of the $j^{th}$ transformer; and calculating a square wave of a bridge arm voltage of each of the primary and secondary converters of the $s^{th}$ transformer based on the electrical angle $\theta_{i1}$ and the electrical angle $\theta_{kps}$ of the $s^{th}$ transformer after compensation.

Optionally, in order to calculate the square wave of the bridge arm voltage of the primary and secondary converters of the $s^{th}$ transformer based on the electrical angle $\theta_{i1}$ and the electrical angle $\theta_{kps}$ of the $s^{th}$ transformer after compensation, the processor of the cascaded power electronic transformer is configured to: calculate a duty cycle $D_1$ of the first primary converter of the $s^{th}$ transformer based on the electrical angle $\theta_{11}$ of the $s^{th}$ transformer and the electrical angle $\theta_{kps}$, and calculate a duty ratio $D_i$ of the $i^{th}$ primary converter of the $s^{th}$ transformer based on the electrical angle $\theta_{i1}$ of the $s^{th}$ transformer and the electrical angle $\theta_{kps}$, where $\theta_{11}$ represents an electrical angle between the bridge arm voltage of the first primary converter of the $s^{th}$ transformer and itself, that is, zero; and calculate a square wave of the bridge arm voltage of the first primary converter of the $s^{th}$ transformer based on the electrical angle $\theta_{11}$ of the $s^{th}$ transformer and the duty ratio $D_1$, calculate a square wave of the bridge arm voltage of the $i^{th}$ primary converter of the $s^{th}$ transformer based on the electrical angle $\theta_{i1}$ of the $s^{th}$ transformer and the duty ratio $D_i$, and calculate a square wave of the bridge arm voltage of the $k^{th}$ secondary converter of the $s^{th}$ transformer based on the compensated electrical angle $\theta_{kps}$ of the $s^{th}$ transformer.

Optionally, in order to calculate the electrical angle $\theta_{kps}$ of the $s^{th}$ transformer, the processor of the cascaded power electronic transformer is configured to: operate a direct current link voltage loop corresponding to the $i^{th}$ primary converter of the $s^{th}$ transformer; operate a control loop corresponding to an $h^{th}$ series branch in a $g^{th}$ parallel branch at the same output port; and add the output of the direct current link voltage loop and the output of the control loop to obtain the uncompensated electrical angle $\theta_{kps}$.

The direct current link voltage loop corresponding to the $i^{th}$ primary converter of the $s^{th}$ transformer operates as follows. The primary DC/AC converters of all the transformers are applied with the same direct current link voltage reference $U_{dcref}$. The direct current link voltage loop corresponding to the $i^{th}$ primary converter of the $s^{th}$ transformer subtracts the direct current link voltage reference $U_{dcref}$ from the direct current link voltage $U_{dcis}$ of the $i^{th}$ primary converter, and outputs a result via a third regulator, as an output of the direct current link voltage loop.

The control loop corresponding to the $h^{th}$ series branch in a $g^{th}$ parallel branch at the same output port operates as follows. It is determined at the output port whether the output port is to output a constant voltage or constant current.

In a case that the output port is to output a constant voltage, the voltage reference Uoref of the output port is divided by q, to obtain a voltage reference of each series branch, so as to equalize the voltage among the series branches. The voltage reference $U_{oref}$ of each series branch is divided by q and then minus an actual voltage $U_{oh}$, and is outputted via a fourth regulator. The output result of the fourth regulator is multiplied by 1/p to obtain a current reference of each parallel branch, so as to equalize the current among the parallel branches. The current reference is compared with a current $I_{ogh}$ outputted by the $h^{th}$ series branch in the $g^{th}$ parallel branch, and a difference is outputted by a fifth regulator, as an output of the control loop, where g=1, 2 . . . , p and h=1, 2, . . . , q.

In a case that the output port is to output a constant current, an output power reference Poref of the output port is divided by $p*q*U_o$ to obtain a current reference of each parallel branch in each series branch, so as to equalize the current among the parallel branches. The current reference is subtracted from an output current $I_{ogh}$ of the $h^{th}$ series branch in the $g^{th}$ parallel branch, and then is outputted via a sixth regulator. Further, voltages of the q series branches are added together and the sum is divided by q to obtain a voltage reference of each series branch, so as to equalize the voltage among the series branches. The voltage reference is subtracted from a voltage $U_{ogh}$ outputted by the $h^{th}$ series branch in the $g^{th}$ parallel branch, and then is outputted via a seventh regulator. A sum of the output of the sixth regulator and the output of the seventh regulator is determined as the output of the control loop.

Optionally, the processor of the cascaded power electronic transformer is further configured to: for each of the n transformers, perform power frequency second harmonic suppression on a direct current link of each primary converter of the transformer.

The power frequency second harmonic suppression is performed on the direct current link of the primary converter of the transformer as follows. A 100 Hz second-order band-pass filter extracts a power frequency second harmonic component from a direct current of the primary converter. The power frequency second harmonic component serving as a feedback minus zero serving as a reference, and the result is outputted via a proportional resonant controller with a resonant frequency of 100 Hz and then is added to the uncompensated electrical angle $\theta_{kps}$.

Optionally, the processor of the cascaded power electronic transformer in unnecessary to calculate $\theta_{i1}$ in a case of n≥2 and m=1.

Optionally, the processor of the cascaded power electronic transformer in unnecessary to calculate $\theta_j$ in a case of n=1 and m≥2.

Embodiments in this specification are described in a progressive way, each of which emphasizes the differences from others, and the same or similar parts among the embodiments can be referred to each other. Since the cascaded power electronic transformer disclosed in the embodiments corresponds to the method therein, the description of the cascaded power electronic transformer is relatively simple, and for relevant matters references may be made to the description of the method.

Terms such as "first", "second" and the like in the description, claims and the above drawings are only for distinguishing similar objects, rather than describe a particular or chronological order. Further, the terms such as "include", "comprise" or any other variants thereof are intended to be non-exclusive. Therefore, a process, method, product or device including a series of elements includes not only the elements but also other elements that are not enumerated, or include other elements inherent for the process, method, product or device. Unless expressively limited otherwise, the statement "comprising (including) one . . . " does not exclude the case that other similar elements may exist in the process, method, product or device.

The disclosed embodiments are described above, so that these skilled in the art can implement or use the present disclosure. Various modifications to these embodiments are apparent to those skilled in the art. The general principles defined herein may be implemented in other embodiments with out departing from the spirit or scope of the present disclosure. Therefore, the present disclosure is to be accorded the widest scope consistent with the principles and novel features disclosed herein rather than limited to the embodiments shown herein.

The invention claimed is:

1. A method for controlling a cascaded power electronic transformer, wherein each phase of the cascaded power electronic transformer comprises n transformers, each of the n transformers comprises m primary windings and r secondary windings, wherein n≥2, m≥2, and r≥1, each of the m primary windings is connected in series with a DC/AC converter, each of the r secondary windings is connected in series with an AC/DC converter, direct current sides of the n*m DC/AC converters each are connected to a pre-converter and are connected in series to form an input port of the cascaded power electronic transformer, and the cascaded power electronic transformer comprises one or more output ports each formed by selecting at least one AC/DC converter from a secondary-side of each of the n transformers and connecting direct current sides of the selected AC/DC converters in series and parallel, and wherein the method for controlling a cascaded power electronic transformer comprises:

calculating electrical angles $\theta_{i1}$ and $\theta_{kps}$ of an $s^{th}$ transformer and a compensation electrical angle $\theta_j$ of a $j^{th}$ transformer, wherein S=1, 2, ..., n;

in a same transformer, a DC/AC converter connected in series with an $i^{th}$ primary winding of the transformer is defined as an $i^{th}$ primary converter, and an AC/DC converter connected in series with a $k^{th}$ secondary winding of the transformer is defined as a $k^{th}$ secondary converter;

a bridge arm voltage of a first primary converter of the transformer serves as a reference voltage, an electrical angle between a bridge arm voltage of the $i^{th}$ primary converter and the reference voltage is denoted as $\theta_{i1}$, wherein i=2, 3, ..., m, and an electrical angle between a bridge arm voltage of the $k^{th}$ secondary converter and the reference voltage is denoted as $\theta_{kps}$, wherein k=1, 2, ..., r;

voltage references corresponding to respective transformers at the same phase are equal, and a voltage reference of a transformer at one phase differs from a voltage reference of a transformer at another phase by $2\pi/3$ electrical angle, wherein the two transformers have the same ordinal number in respective phases;

a compensation angle between a bridge arm voltage of a primary converter and a bridge arm voltage of a secondary converter of the $j^{th}$ transformer is denoted as $\theta_j$, wherein j=2, 3, ..., n;

a sum of direct current link currents of the m primary converters of the $s^{th}$ transformer is calculated by a balance control current loop corresponding to the $i^{th}$ primary winding of the $s^{th}$ transformer, and is divided by m to obtain a current reference, the current reference is subtracted from a direct current link current $I_{dcis}$ of the $i^{th}$ primary converter of the $s^{th}$ transformer, and the electrical angle $\theta_{i1}$ of the $s^{th}$ transformer is outputted via a first regulator; and in order to equalize power among different secondary converters at a same output port by modifying electrical angles $\theta_{1ps}, \theta_{2ps}, \ldots, \theta_{rps}$, a sum of direct current link currents of the m*n primary converters at a same phase is calculated by a transformer balance control current loop corresponding to the $j^{th}$ transformer, and is divided by n to obtain a current reference, the current reference is subtracted from a sum of direct current link currents of the m primary converters of the $j^{th}$ transformer, and the compensation electrical angle $\theta_j$ is outputted via a second regulator;

adding the compensation electrical angle $\theta_j$ to an electrical angle $\theta_{kps}$ of the $j^{th}$ transformer, to obtain a compensated electrical angle $\theta_{kps}$ of the $j^{th}$ transformer; and calculating a square wave of a bridge arm voltage of each of the m primary converters and the r secondary converters of the $s^{th}$ transformer based on the electrical angle $\theta_{i1}$ and the electrical angle $\theta_{kps}$ of the $s^{th}$ transformer after compensation.

2. The method for controlling a cascaded power electronic transformer according to claim 1, wherein the calculating a square wave of a bridge arm voltage of each of the m primary converters and the r secondary converters of the $s^{th}$ transformer based on the electrical angle $\theta_{i1}$ and the electrical angle $\theta_{kps}$ of the $s^{th}$ transformer after compensation comprises:

calculating a duty cycle $D_1$ of a first primary converter of the $s^{th}$ transformer based on an electrical angle $\theta_{11}$ and the electrical angle $\theta_{kps}$ of the $s^{th}$ transformer, and calculating a duty ratio $D_i$ of the $i^{th}$ primary converter of the $s^{th}$ transformer based on the electrical angle $\theta_{i1}$ and the electrical angle $\theta_{kps}$ of the $s^{th}$ transformer, wherein $\theta_{11}$ represents an electrical angle between the bridge arm voltage of the first primary converter of the $s^{th}$ transformer and itself, that is, zero; and calculating a square wave of a bridge arm voltage of the first primary converter of the $s^{th}$ transformer based on the electrical angle $\theta_{11}$ of the $s^{th}$ transformer and the duty ratio $D_1$, calculating a square wave of a bridge arm voltage of the $i^{th}$ primary converter of the $s^{th}$ transformer based on the electrical angle $\theta_{i1}$ of the $s^{th}$ transformer and the duty ratio $D_i$, and calculating a square wave of a bridge arm voltage of the $k^{th}$ secondary converter of the $s^{th}$ transformer based on the compensated electrical angle $\theta_{kps}$ of the $s^{th}$ transformer.

3. The method for controlling a cascaded power electronic transformer according to claim 1, wherein the calculating an electrical angle $\theta_{kps}$ of the $s^{th}$ transformer comprises:

operating a direct current link voltage loop corresponding to the $i^{th}$ primary converter of the $s^{th}$ transformer;

operating a control loop corresponding to an $h^{th}$ series branch in a $g^{th}$ parallel branch at the same output port; and adding an output of the direct current link voltage loop and an output of the control loop to obtain an uncompensated electrical angle $\theta_{kps}$, wherein the operating a direct current link voltage loop corresponding to the $i^{th}$ primary converter of the $s^{th}$ transformer comprises:

applying a same direct current link voltage reference $U_{dcref}$ to primary DC/AC converters of all the transformers;

subtracting, by the direct current link voltage loop corresponding to the $i^{th}$ primary converter of the $s^{th}$ transformer, the direct current link voltage reference $U_{dcref}$ from a direct current link voltage $U_{dcis}$ of the $i^{th}$ primary converter; and outputting, via a third regulator, a result of the subtraction, as the output of the direct current link voltage loop, and the operating a control loop corresponding to an $h^{th}$ series branch in a $g^{th}$ parallel branch at the same output port comprises:

determining at the output port whether the output port is to output a constant voltage or constant current, wherein in a case that the output port is to output a constant voltage, a voltage reference $U_{oref}$ of the output port is divided by q, to obtain a voltage reference of each series branch, so as to equalize a voltage among the series branches; a voltage reference $U_{oref}$ of each series branch is divided by q and minus an actual voltage $U_{oh}$, and is outputted via a fourth regulator; an output result of the fourth regulator is multiplied by 1/p to obtain a current reference of each parallel branch, so as to equalize a current among the parallel branches; and the current reference is compared with a current $I_{ogh}$ outputted by the $h^{th}$ series branch in the $g^{th}$ parallel branch, and a difference is outputted by a fifth regulator, as the output of the control loop, wherein g=1, 2 . . . , p and h=1, 2, . . . , q; and in a case that the output port is to output a constant current, an output power reference Poref of the output port is divided by p*q*$U_o$ to obtain a current reference of each parallel branch in each series branch, so as to equalize a current among the parallel branches; the current reference is subtracted from an output current $I_{ogh}$ of the $h^{th}$ series branch in the $g^{th}$ parallel branch, and a result of the subtraction is outputted via a sixth regulator; voltages of the q series branches are added together and the obtained sum is divided by q to obtain a voltage reference of each series branch, so as to equalize a voltage among the series branches; the voltage reference is subtracted from a voltage $U_{ogh}$ outputted by the $h^{th}$ series branch in the $g^{th}$ parallel branch, and a result of the subtraction is outputted via a seventh regulator; and a sum of the output of the sixth regulator and the output of the seventh regulator is determined as the output of the control loop.

4. The method for controlling a cascaded power electronic transformer according to claim 1, further comprising:

performing, for each of the n transformers, power frequency second harmonic suppression on a direct current link of each primary converter of the transformer, wherein the performing power frequency second harmonic suppression on a direct current link of each primary converter of the transformer comprises:

extracting, by a 100 Hz second-order band-pass filter, a power frequency second harmonic component from a direct current of the primary converter;

subtracting zero serving as a reference from the power frequency second harmonic component serving as a feedback; and outputting a result of the subtraction via a proportional resonant controller with a resonant frequency of 100 Hz, and adding the result to an uncompensated electrical angle $\theta_{kps}$ of the converter.

5. The method for controlling a cascaded power electronic transformer according to claim 1, wherein the calculation of $\theta_{i1}$ is not performed in a case of n≥2 and m=1.

6. The method for controlling a cascaded power electronic transformer according to claim 1, wherein the calculation of $\theta_j$ is not performed in a case of n=1 and m≥2.

7. A cascaded power electronic transformer, comprising:

a main circuit, wherein each phase of the cascaded power electronic transformer comprises n transformers, each of the n transformers comprises m primary windings and r secondary windings, wherein n≥2, m≥2, and r≥1, each of the m primary windings is connected in series with a DC/AC converter, each of the r secondary windings is connected in series with an AC/DC converter, direct current sides of the n*m DC/AC converters each are connected to a pre-converter and are connected in series to form an input port of the cascaded power electronic transformer, and the cascaded power electronic transformer comprises one or more output ports each formed by selecting at least one AC/DC converter from a secondary-side of each of the n transformers and connecting direct current sides of the selected AC/DC converters in series and parallel; and a controller, wherein the controller comprises a processor, a memory and a program stored in the memory and executable on the processor, and the processor is configured to, when executing the program:

calculate electrical angles $\theta_{i1}$ and $\theta_{kps}$ of an $s^{th}$ transformer and a compensation electrical angle $\theta_j$ of a $j^{th}$ transformer, wherein s=1, 2, . . . , n;

in a same transformer, a DC/AC converter connected in series with an $i^{th}$ primary winding of the transformer is defined as an $i^{th}$ primary converter, and an AC/DC converter connected in series with a $k^{th}$ secondary winding of the transformer is defined as a $k^{th}$ secondary converter;

a bridge arm voltage of a first primary converter of the transformer serves as a reference voltage, an electrical angle between a bridge arm voltage of the $i^{th}$ primary converter and the reference voltage is denoted as $\theta_{i1}$, wherein i=2, 3, . . . , m, and an electrical angle between a bridge arm voltage of the $k^{th}$ secondary converter and the reference voltage is denoted as $\theta_{kps}$, wherein k=1, 2, . . . , r;

voltage references corresponding to respective transformers at the same phase are equal, and a voltage reference of a transformer at one phase differs from a voltage reference of a transformer at another phase by 2π/3 electrical angle, wherein the two transformers have the same ordinal number in respective phases;

a compensation angle between a bridge arm voltage of a primary converter and a bridge arm voltage of a secondary converter of the $j^{th}$ transformer is denoted as $\theta_j$, wherein j=2, 3, . . . , n;

a sum of direct current link currents of the m primary converters of the $s^{th}$ transformer is calculated by a balance control current loop corresponding to the $i^{th}$ primary winding of the $s^{th}$ transformer, and is divided by m to obtain a current reference, the current reference is subtracted from a direct current link current $I_{dcis}$ of the $i^{th}$ primary converter of the $s^{th}$ transformer, and the electrical angle $\theta_{i1}$ of the $s^{th}$ transformer is outputted via a first regulator; and in order to equalize power among different secondary converters at a same output port by modifying electrical angles $\theta_{1ps}, \theta_{2ps}, \ldots, \theta_{rps}$, a sum of direct current link currents of the m*n primary converters at a same phase is calculated by a transformer balance control current loop corresponding to the $j^{th}$ transformer, and is divided by n to obtain a current reference, the current reference is subtracted from a sum of direct current link currents of the m primary converters of the $j^{th}$ transformer, and the compensation electrical angle $\theta_j$ is outputted via a second regulator;

add the compensation electrical angle $\theta_j$ to an electrical angle $\theta_{kps}$ of the $j^{th}$ transformer, to obtain a compensated electrical angle $\theta_{kps}$ of the $j^{th}$ transformer; and calculate a square wave of a bridge arm voltage of each of the m primary converters and the r secondary converters of the $s^{th}$ transformer based on the electrical angle $\theta_{i1}$ and the electrical angle $\theta_{kps}$ of the $s^{th}$ transformer after compensation.

8. The cascaded power electronic transformer according to claim 7, wherein in order to calculate a square wave of a bridge arm voltage of each of the m primary converters and the r secondary converters of the $s^{th}$ transformer based on the electrical angle $\theta_{i1}$ and the electrical angle $\theta_{kps}$ of the $s^{th}$ transformer after compensation, the processor is configured to:

calculate a duty cycle $D_1$ of a first primary converter of the $s^{th}$ transformer based on an electrical angle $\theta_{11}$ and the electrical angle $\theta_{kps}$ of the $s^{th}$ transformer, and calculate a duty ratio $D_1$ of the $i^{th}$ primary converter of the $s^{th}$ transformer based on the electrical angle $\theta_{i1}$ and the electrical angle $\theta_{kps}$ of the $s^{th}$ transformer, wherein $\theta_{11}$ represents an electrical angle between the bridge arm voltage of the first primary converter of the $s^{th}$ transformer and itself, that is, zero; and calculate a square wave of a bridge arm voltage of the first primary converter of the $s^{th}$ transformer based on the electrical angle $\theta_{11}$ of the $s^{th}$ transformer and the duty ratio $D_1$, calculate a square wave of a bridge arm voltage of the $i^{th}$ primary converter of the $s^{th}$ transformer based on the electrical angle $\theta_{i1}$ of the $s^{th}$ transformer and the duty ratio $D_i$, and calculate a square wave of a bridge arm voltage of the $k^{th}$ secondary converter of the $s^{th}$ transformer based on the compensated electrical angle $\theta_{kps}$ of the $s^{th}$ transformer.

9. The cascaded power electronic transformer according to claim 7, wherein in order to calculate the electrical angle $\theta_{kps}$ of the $s^{th}$ transformer, the processor is configured to:

operate a direct current link voltage loop corresponding to the $i^{th}$ primary converter of the $s^{th}$ transformer;

operate a control loop corresponding to an $h^{th}$ series branch in a $g^{th}$ parallel branch at the same output port; and add an output of the direct current link voltage loop and an output of the control loop to obtain an uncompensated electrical angle $\theta_{kps}$, wherein in order to operate the direct current link voltage loop corresponding to the $i^{th}$ primary converter of the $s^{th}$ transformer, the processor is configured to:

apply a same direct current link voltage reference $U_{dcref}$ to primary DC/AC converters of all the transformers;

subtract, by the direct current link voltage loop corresponding to the $i^{th}$ primary converter of the $s^{th}$ transformer, the direct current link voltage reference $U_{dcref}$ from a direct current link voltage $U_{dcis}$ of the $i^{th}$ primary converter; and output, via a third regulator, a result of the subtraction, as the output of the direct current link voltage loop, and in order to operate the control loop corresponding to the $h^{th}$ series branch in the $g^{th}$ parallel branch at the same output port, the processor is configured to:

determine at the output port whether the output port is to output a constant voltage or constant current, wherein in a case that the output port is to output a constant voltage, a voltage reference Uoref of the output port is divided by q, to obtain a voltage reference of each series branch, so as to equalize a voltage among the series branches; a voltage reference $U_{oref}$ of each series branch is divided by q and minus an actual voltage $U_{oh}$, and is outputted via a fourth regulator; an output result of the fourth regulator is multiplied by 1/p to obtain a current reference of each parallel branch, so as to equalize a current among the parallel branches; and the current reference is compared with a current $I_{ogh}$ outputted by the $h^{th}$ series branch in the $g^{th}$ parallel branch, and a difference is outputted by a fifth regulator, as the output of the control loop, wherein $g=1, 2 \ldots , p$ and $h=1, 2, \ldots , q$; and in a case that the output port is to output a constant current, an output power reference Poref of the output port is divided by $p*q*U_o$ to obtain a current reference of each parallel branch in each series branch, so as to equalize a current among the parallel branches; the current reference is subtracted from an output current $I_{ogh}$ of the $h^{th}$ series branch in the $g^{th}$ parallel branch, and a result of the subtraction is outputted via a sixth regulator; voltages of the q series branches are added together and the obtained sum is divided by q to obtain a voltage reference of each series branch, so as to equalize a voltage among the series branches; the voltage reference is subtracted from a voltage $U_{ogh}$ outputted by the $h^{th}$ series branch in the $g^{th}$ parallel branch, and a result of the subtraction is outputted via a seventh regulator; and a sum of the output of the sixth regulator and the output of the seventh regulator is determined as the output of the control loop.

10. The cascaded power electronic transformer according to claim 7, wherein the processor is further configured to:

perform, for each of the n transformers, power frequency second harmonic suppression on a direct current link of each primary converter of the transformer, wherein in order to perform, for the transformer, the power frequency second harmonic suppression on the direct current link of the primary converter of the transformer, the processor is configured to:

extract, via a 100 Hz second-order band-pass filter, a power frequency second harmonic component from a direct current of the primary converter;

subtract zero serving as a reference from the power frequency second harmonic component serving as a feedback; and output a result of the subtraction via a proportional resonant controller with a resonant frequency of 100 Hz, and adding the result to an uncompensated electrical angle $\theta_{kps}$ of the converter.

11. The cascaded power electronic transformer according to claim 7, wherein the processor is configured to skip the calculation of $\theta_{i1}$ in a case of n≥2 and m=1.

12. The cascaded power electronic transformer according to claim 7, wherein the processor is configured to skip the calculation of $\theta_j$ in a case of n=1 and m≥2.

* * * * *